Patented June 23, 1931

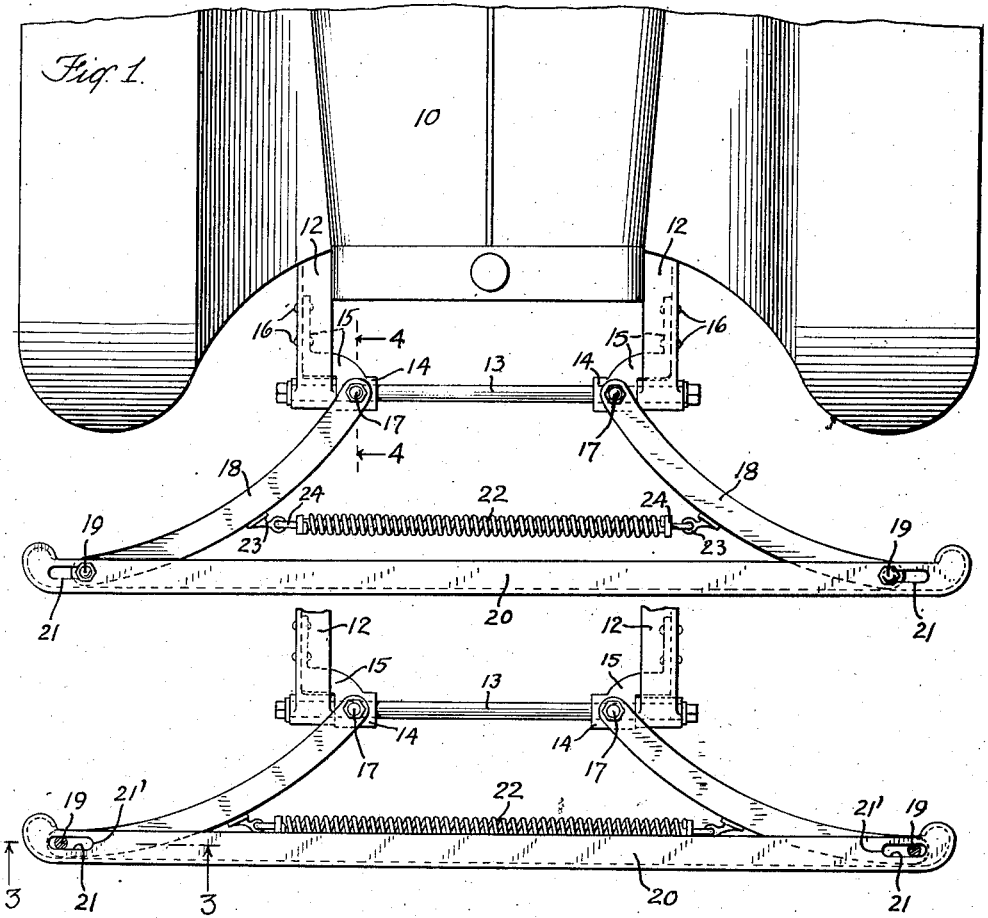
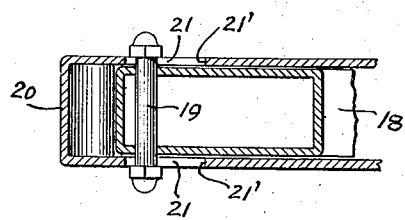
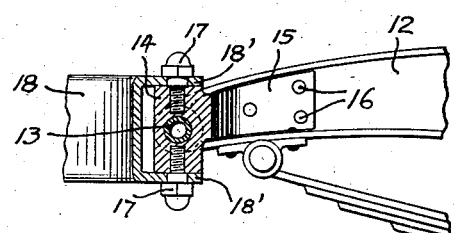

1,811,569

UNITED STATES PATENT OFFICE

ADOLPH A. THOMAS, OF NEW YORK, N. Y.

VEHICLE BUMPER

Application filed April 16, 1930. Serial No. 444,636.

My invention is for an automobile bumper in which an elastic element arranged transversely of the car is expanded to take up the shock of an impact. This elastic element may be a coil spring or a rubber bar connected to a pair of pivoted levers diverging outwardly. An impact member is slidably connected to the outer ends of the diverging levers, whereby the latter are spread apart and expand the spring when the impact member strikes an obstruction. The expansion of the transverse spring absorbs the force of the head-on impact by translating it crosswise of the car. The bumper structure as a whole is very simple and compact, requiring only a few rugged parts which are cheap to make and easily assembled. The practical advantages and novel features of my invention will be understood from a description of the accompanying drawings in which—

Fig. 1 shows my new bumper in plan view secured to the front of an automobile, the movable parts being in normal position;

Fig. 2 shows how the diverging levers are spread and the spring is expanded when the bumper bar strikes an obstruction;

Fig. 3 is an enlarged section on line 3—3 of Fig. 2; and

Fig. 4 is an enlarged section on line 4—4 of Fig. 1.

The chassis of automobile 10 has the usual extensions 12 which are connected by a bar 13. Two blocks 14 are mounted on bar 13 near extensions 12, and each block has an arm or bracket 15 secured to the adjacent extension by rivets 16 or otherwise. The parts 14 and 15 may be a single casting of suitable metal. Each block 14 carries a pair of vertically aligned bolts or pivot pins 17 which support a pair of outwardly diverging levers 18. These levers are preferably channel-shaped in cross-section, and the flanges 18' of each lever overlap the associated block 14 for receiving the pivot pins 17. This provides a strong pivotal support for levers 18, as will be understood from Fig. 4.

The levers 18 are preferably shaped to diverge outwardly in substantially continuous curves, and their outer ends carry bolts or pins 19 for supporting a bumper bar 20. This bar is preferably channel-shaped in cross-section and the flanges thereof have slots 21 for receiving the pivot pins 19, whereby the bumper bar and levers 18 are slidably connected. In the present instance the bumper bar 20 is shown straight, but it may be curved if desired. A coil spring 22 or other elastic element, such as a solid bar of india rubber, is connected at its ends to levers 18 in any practical way. For illustration I have shown a pair of eyes 23 secured to levers 18 for receiving hooks 24 attached to the ends of the spring, which is arranged crosswise of the car substantially parallel with bumper bar 20. This parallel arrangement of parts 20 and 22 is maintained even when the diverging levers 18 are spread under the force of an impact.

The elastic element 22 is normally tensioned to a predetermined extent and holds the bolts 19 against the inner ends 21' of slots 21. When the bumper bar 20 strikes an obstruction, the inward movement of the bar spreads the outer ends of lever 18 farther apart, so that the spring 22 is expanded and takes up the shock of the collision. The parts of the bumper structure are so designed that the expanding spring 22 is capable of absorbing a predetermined maximum force. The length of slots 21 is sufficient to allow a maximum expansion of coil spring or rubber bar 22. I have not endeavored to show the relative proportions of the parts with mathematical exactness, for various makes and sizes of cars will naturally require changes in the design and arrangement of the elements that make up the bumper structure as a whole.

Instead of using only one spring 22, I may employ two or more springs, especially in bumpers for heavy cars, trucks, buses, vans and other vehicles. The spring 22 may be so designed and its initial tension so calculated that the expansion of the spring will not be more than ten or twelve per cent to take up the maximum shock which the car is liable to encounter. However, I mention these figures merely by way of illustration and not in a restrictive sense. The points at which the spring 22 is connected to levers 18 will depend upon the strength of the spring, the normal angle of the levers, the distance between pivot pins 17, and other factors that may come up in practice. It will be understood that the vehicle 10 in Fig. 1 represents any type, size or kind of vehicle to which my bumper may be attached.

Although I have shown and described a specific structure, I want it understood that my invention is not limited to the details set forth, unless these are expressly included in the claims. Changes and modifications will probably be made by others without departing from the appended claims which define the scope of my invention.

I claim as my invention:

1. A bumper structure for automobiles comprising a pair of outwardly diverging levers pivoted at their inner ends to the car, tensioned elastic means connected to said levers at points between the inner and outer ends of the levers, and a bumper bar slidably connected to the outer ends of said levers, whereby the latter are spread apart to expand said elastic means when the bumper bar strikes an obstruction.

2. A bumper structure for automobiles comprising a pair of outwardly diverging levers pivoted at their inner ends to the car, a tensioned elastic element connected at its ends to said levers and arranged transversely of the car, and a bumper bar having a pin-and-slot connection with said levers for spreading the same under the force of an impact, whereby said elastic element is expanded to absorb the shock.

3. A bumper structure for automobiles comprising a pair of outwardly diverging levers pivoted at their inner ends to the car, a tensioned elastic element connected at its ends to said levers and arranged transversely of the car, the length of said elastic element being greater than the distance between the spaced pivots of said levers, and a bumper bar arranged substantially parallel with said elastic element and adjustably connected with said levers, whereby the force of an impact on said bar spreads the diverging levers and expands the elastic element.

4. A bumper structure for automobiles comprising a pair of levers pivoted at their inner ends to the car and diverging outwardly in substantially continuous curves, a tensioned coil spring connected at its ends to said levers and arranged transversely of the car, the length of said spring being greater than the distance between the spaced pivots of said levers, and a bumper bar slidably connected to the outer ends of said levers to spread the same apart under the force of an impact and thereby expand said spring.

5. A bumper structure for automobiles comprising a pair of outwardly diverging levers pivoted at their inner ends to the car, a tensioned elastic element connected at its ends to said levers and arranged transversely of the car, and a bumper bar slidably connected to the outer ends of said levers to spread the same apart under the force of an impact and thereby expand said elastic element, the normal distance between the outer ends of said levers being not less than twice the distance between the pivoted inner ends of the levers.

6. A bumper structure for automobiles comprising a pair of outwardly diverging levers pivoted at their inner ends to the car, a pin or bolt carried by each lever near its outer end, a tensioned coil spring connected to said levers and arranged transversely of the car, and a substantially straight bumper bar having slots near its outer ends for receiving said bolts to permit spreading of the diverging levers under the force of an impact, said bumper bar being substantially parallel with said elastic element which expands when the levers are spread apart.

7. A bumper structure for automobiles comprising a pair of outwardly diverging levers pivoted at their inner ends to the car, said levers being channel-shaped in cross-section, a tensioned elastic element connected to said levers and arranged transversely of the car, and a channel-shaped bumper bar slidably connected to the outer ends of said levers, whereby the latter are spread apart to expand said elastic element when the bumper bar strikes an obstruction, said slidable connections including a pair of bolts or pins passing through the overlapping flanges of said bar and levers, one pair of said overlapping flanges having slots for said bolts.

8. In an automobile having a pair of extensions on its chassis and a cross bar connecting said extensions, a pair of blocks mounted on said bar near said extensions and provided each with a bracket secured to the adjacent extension, a pair of channel-shaped levers pivoted at their inner ends to said blocks and diverging outwardly, the top and bottom flanges of each lever overlapping the supporting block to form a double hinge connection, a bumper bar for spreading said levers apart under the force of an impact, and elastic means connected to said levers and adapted to be expanded when the levers are spread.

9. In an automobile having a pair of extensions on its chassis and a cross bar connecting said extensions, a pair of blocks mounted on said bar near said extensions and provided each with a bracket secured to the adjacent extension, a pair of channel-shaped levers pivoted at their inner ends to said blocks and diverging outwardly, the pivotal connection of each lever including a pair of axially aligned bolts or pins mounted in the supporting block and passing through the top and bottom flanges of the lever, a bumper bar for spreading said levers apart under the force of an impact, and elastic means connected to said levers and adapted to be expanded when the levers are spread.

10. In an automobile having a pair of extensions on its chassis and a cross bar connecting said extensions, a pair of blocks mounted on said bar near said extensions and provided each with a bracket secured to the adjacent extension, a pair of channel-shaped levers pivoted at their inner ends to said blocks and diverging outwardly, the top and bottom flanges of each lever overlapping the supporting block to form a double hinge connection, a bumper bar slidably connected to the outer ends of said levers for spreading the same apart under the force of an impact, and a tensioned elastic element connected to said levers and arranged transversely of the car, whereby said elastic element expands when the levers are spread.

11. An automobile bumper structure comprising a pair of outwardly diverging levers pivoted at their inner ends to the car in predetermined spaced relation, a single elastic element connected at its ends to said levers and a bumper bar slidably connected to the outer ends of said levers, whereby the latter are spread apart to expand said elastic element when the bumper bar strikes an obstruction.

12. In an automobile having a pair of extensions on its chassis, a cross bar connecting said extensions, a pair of blocks mounted on said bar near said extensions and provided each with a bracket secured to the adjacent extension, and a bumper structure carried by said blocks.

13. In an automobile having a pair of extensions on its chassis, a cross bar connecting said extensions, a pair of blocks mounted on said bar near said extensions and provided each with a bracket secured to the adjacent extension, and a bumper structure carried by said blocks, said bumper structure including a pair of diverging elements attached to said blocks.

ADOLPH A. THOMAS.